United States Patent [19]

Muramatsu

[11] Patent Number: 4,938,042
[45] Date of Patent: Jul. 3, 1990

[54] SHIFT LEVER LOCKING APPARATUS

[75] Inventor: Tadao Muramatsu, Toyota, Japan

[73] Assignee: Toyota Jidosha Kabushiki Kaisha, Aichi, Japan

[21] Appl. No.: 260,677

[22] Filed: Oct. 21, 1988

[30] Foreign Application Priority Data

Oct. 27, 1987 [JP] Japan ............... 62-164093[U]

[51] Int. Cl.$^5$ .............................. E05B 65/12
[52] U.S. Cl. ........................ 70/245; 70/247; 70/248; 74/878; 192/4 A
[58] Field of Search .......... 70/245, 247, 248; 74/850, 878, 483 R; 192/4 A

[56] References Cited

U.S. PATENT DOCUMENTS

| 2,875,640 | 3/1959 | Huso | 192/4 A |
|---|---|---|---|
| 2,890,581 | 6/1959 | Lewis | 70/248 |
| 3,917,021 | 11/1975 | Williams et al. | 70/245 X |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,232,571 | 11/1980 | Kimberlin | 70/247 X |
| 4,235,123 | 11/1980 | Simanck et al. | 70/247 X |
| 4,249,404 | 2/1981 | Kimberlin | 70/248 |
| 4,304,112 | 12/1981 | Osborn | 70/247 |
| 4,326,432 | 4/1982 | Miller | 70/248 X |
| 4,473,141 | 9/1984 | Mochida | 192/4 A |
| 4,474,085 | 10/1984 | DeVogelaere et al. | 70/248 X |
| 4,614,256 | 9/1986 | Kuwayama et al. | 192/4 A |
| 4,660,443 | 4/1987 | Simancik | 70/248 X |
| 4,671,085 | 6/1987 | Yamaguchi et al. | 70/248 |
| 4,724,722 | 2/1988 | Beauch et al. | 70/248 X |
| 4,768,610 | 9/1988 | Pagel et al. | 192/4 A |

FOREIGN PATENT DOCUMENTS 2557050 6/1985 France ...................... 70/247
60-20447 2/1985 Japan .

Primary Examiner—Gary L. Smith
Assistant Examiner—Suzanne L. Dino
Attorney, Agent, or Firm—Oliff & Berridge

[57] ABSTRACT

An apparatus for locking a shift lever associated with an automobile automatic transmission in the parking range is provided. A locking member prevents any movement of the shift lever from the parking range to another range except when the brake pedal is stepped down.

9 Claims, 2 Drawing Sheets

SHIFT LEVER LOCKING APPARATUS

BACKGROUND OF THE INVENTION

This invention relates to an apparatus for locking a shift lever associated with an automobile automatic transmisson in the parking range.

As is well known in the art, in automobiles having an automatic transmission mounted, the engine and the transmission gear are connected through a fluid coupling. The power of the engine is transmitted to the wheels except when the transmission gear is kept in the parking or neutral state. In general, a provision is made such that the engine can be started only when a shift lever for drive control is set in the parking or neutral range. It is also a conventional practice that the brake pedal must be stepped down to accomplish a braked state before the shift lever can be moved from the parking or neutral range to any driving range such as the drive range.

Such a locking apparatus was proposed by the same assignee as the present invention in Japanese Utility Model Application No. 62-119707. The locking apparatus is briefly described. The locking apparatus includes a detent pin and a ratchet plate having a plurality of engagement portions for engaging the detent pin. In association with those engagement portions which the detent pin engages when the shift lever is set to the parking and neutral ranges, a lock piece is provided for preventing the detent pin from disengaging from the engagement portion. A slide plate is provided in combination with the lock piece for moving the lock piece between locking and unlocking positions. An electromagnet is disposed for driving the slide plate. When the requirement is met, for example, if the brake pedal is stepped down or additionally, the engine is rotating at a revolution number below a certain value, the electromagnet is actuated to move the slide plate and hence, the lock piece to the unlocking position, allowing the shift lever to be changed from the parking or neutral range to any desired driving range. In addition, a part of the surface of the lock piece to be in contact with the detent pin is so slanted that an increased push-buttin manipulation can positively unlock the lock piece independent of the electromagnet, also allowing free change of the shift lever.

Since the locking apparatus of the above construction uses the electromagnet as an actuator, it is suitably combined with an automatic transmission of the electronic control type wherein control is carried out by detecting various parameters followed by electric processing. The locking apparatus, however, is not suitable for an automatic transmission of the hydraulic control type because several sensors must be additionally incorporated, resulting in a further complicated structure. This adds to the disadvantage that the locking apparatus is rather complicated as such because it is designed to lock the shift lever in the neutral range as well as the parking range.

There is a need for a shift lever locking apparatus which is of a simple construction and advantageously applicable to not only automatic transmissions of the electronic control type, but also automatic transmissions of the hydraulic control type.

SUMMARY OF THE INVENTION

An object of the present invention is to provide a shift lever locking apparatus capable of locking the shift lever in the parking range and unlocking the shift lever therefrom through mechanical means only without resorting to electric means.

According to the present invention, there is provided a shift lever locking apparatus in combination with an automobile having a pivotally movable brake pedal and a shift lever adapted to be pivotally turned and set at any desired one of positions corresponding to a plurality of driving states including a parking state. The apparatus comprises a detent pin associated with the shift lever so as to be moved up and down by push-button manipulation, a ratchet plate including at least an engagement portion for engaging the detent pin to prevent pivoting of the shift lever when the shift lever is set at the parking state, means for locking the detent pin, the locking means preventing the detent pin from disengaging from the detent pin to disengage from the engagement portion in an unlocking state, a conversion mechanism for translating the pivotal movement of the brake pedal being stepped down into another movement, and mechanical means for cooperatively connecting the conversion mechaanism and the locking means whereby a movement of the conversion mechanism in response to the pivotal movement of the brake pedal being stepped down changes the locking means from the locking state to the unlocking state.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Figure 1:
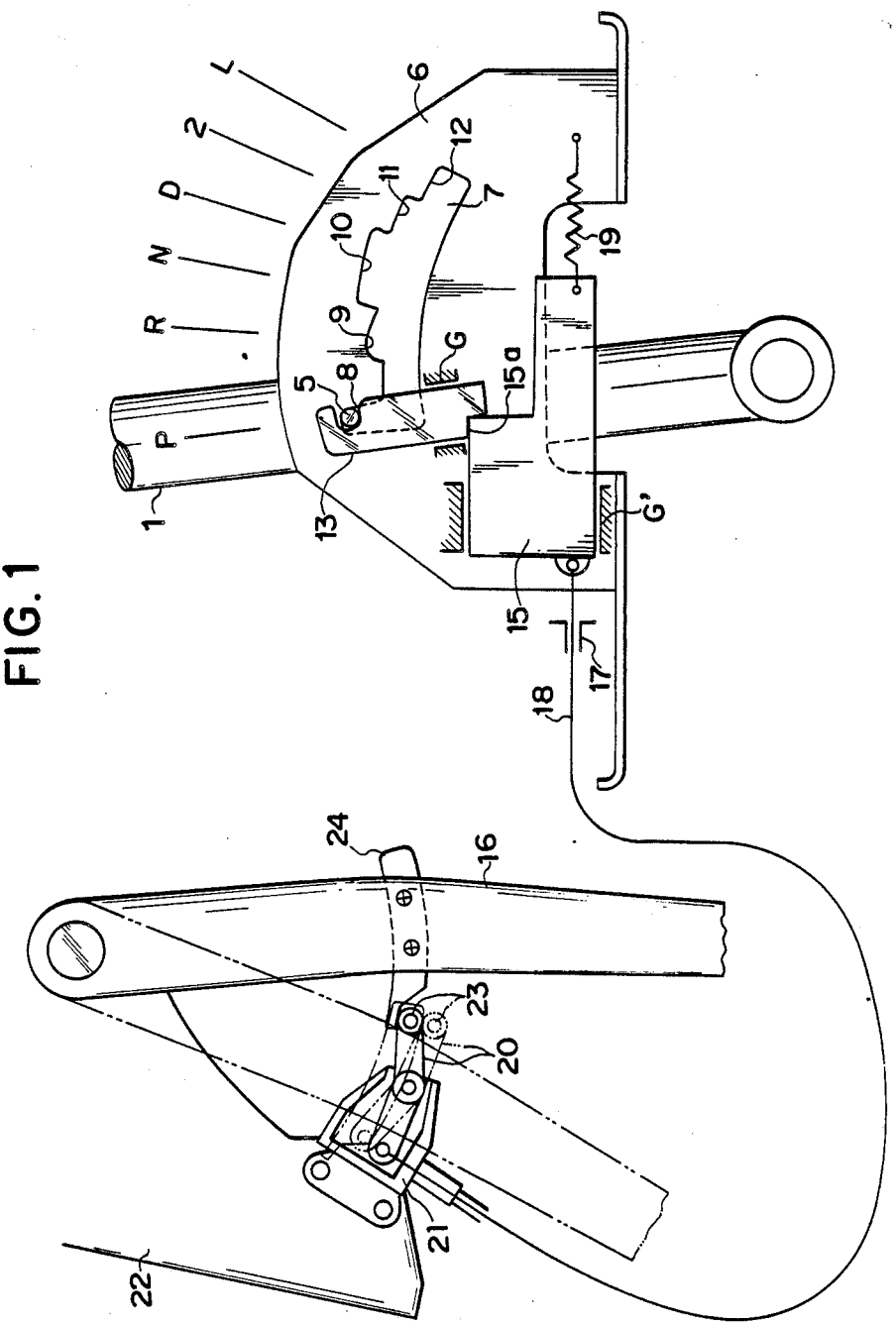
FIG. 1 schematically illustrates a shift lever locking apparatus according to one embodiment of the present invention.
Figure 2:
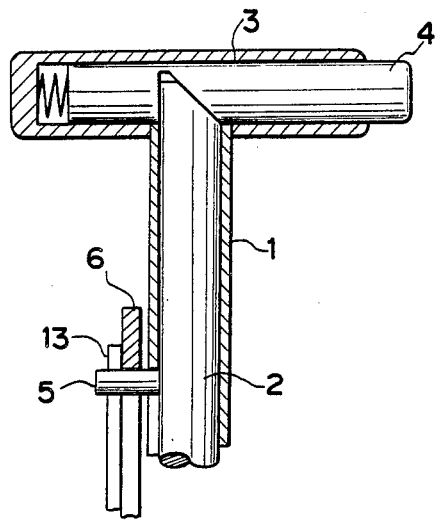
FIG. 2 is a cross-sectional view of the shift lever.

Referring to FIG. 1, there is illustrated a shift lever locking apparatus according to one embodiment of the present invention. Like conventional shift levers, a shift lever 1 extending in an approximately vertical direction may be turned about a horizontal pivot to select a desired driving range in an automatic transmission. The shift lever 1 is associated with a detent mechanism which is also of the same construction as in the prior art. More particularly, the shift lever 1 has received therein a rod 2 which is movable up and down in an axial direction as shown in FIG. 2. The shift lever 1 is provided at its top with a horizontally extending grip portion 3 in a T shape. The grip portion 3 has received therein a knob 4 which is manually movable in a direction parallel to the axis of the pivot about which the shift lever 1 is turned. The knob 4 has a bevelled surface which engages a bevelled surface of the rod 2. Lateral movement of the knob 4 by manual manipulation is converted into vertical movement of the rod 2 through the wedge engagement. The rod 2 is provided with a detent pin 5 extending in a direction parallel to the axis of the pivot about which the shift lever 1 is turned.

A ratchet plate 6 which defines the range of movement of the detent pin 5 is disposed adjacent the shift lever 1 and has a major surface extending parallel to the plane in which the shift lever 1 is turned. The ratchet plate 6 is formed in the major surface with a slot 7 of the shape as best shown in FIG. 1. The slot 7 includes along its upper edge a first engagement portion 8 for holding the detent pin 5 in the parking range, a second engagement portion 9 for holding the detent pin 5 in the reverse range, a third engagement portion 10 for holding the detent pin in the neutral and drive ranges, a fourth engagement portion 11 for holding the detent pin 5 in the "2" range, and a fifth engagement portion 12 for holding the detent pin 5 in the "L" range. These engagement portions 8, 9, 10, 11 and 12 are configured such that upon shifting operations from the reverse range to the neutral range, from the neutral range to the drive range, from the drive range to the neutral range, and from the "L" range to the "2" range further to the drive range, the detent pin 5 is automatically disengaged from the corresponding engagement portion, but upon other shifting operations, the knob 4 must be pushed in to force down the rod 2 to disengage the detent pin 5 from the engagement portion.

Figure 3:
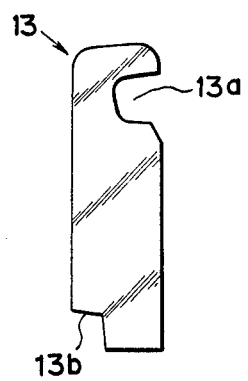
FIG. 3 illustrates a lock piece used in the embodiment of FIG. 1.
Figure 4:
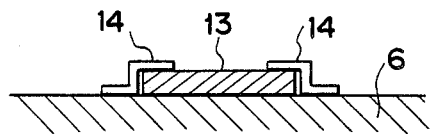
FIG. 4 is a schematic view of one exemplary means for guiding the lock piece.

In parallel with the ratchet plate 6, a lock piece 13 which is movable approximatley vertically is provided for vertical movement at a position corresponding to the first engagement portion 8 with which the detent pin 5 is engaged when the shift lever 1 is set to the parking range. The lock piece 13 serves to prevent the detent pin 5 from the disengaging from the first engagement portion 8. The lock piece 13 may be in the form of a generally rectangular plate as shown in FIG. 3, for example. The lock piece 13 is provided at an upper end with a recess 13a which is open in one longitudinal side. The detent pin 5 is movable into and out of the recess 13a. The lock piece 13 is further provided at a lower end with a pit 13b which is formed by cutting out the lower corner on the other longitudinal side. Means G for guiding the lock piece 13 in a vertical direction may be of any desired structure. For example, as shown in FIG. 4, a pair of spaced-apart fixtures 14 are disposed so as to fit over the opposite longitudinal edges of the lock piece 13 so that the lock piece 13 may be held for vertical movement. Below the lock piece 13 is disposed a slide plate 15 which is movable nearly perpendicular to direction of movement of the lock piece 13. The slide plate 15 includes a shoulder 15a adapted to engage the pit 13b of the lock piece 13 to prevent the lock piece 13 from withdrawing from the raised position, that is, to prevent the detent pin 5 from disengaging from the first engagement portion 8. The lock piece 13 thus forms locking means with the slide plate 15. Like the guide means G associated with the lock piece 13, means G' for guiding the slide plate 15 in a horizontal direction as viewed in FIG. 1 may be of any desired structure, for example, a pair of spaced-apart guide bars as shown in FIG. 4.

The slide plate 15 is interlocked with a brake pedal 16 through a conversion mechanism for translating the pivotal movement of the brake pedal being stepped down into another movement and means for cooperatively connecting the conversion mechanism and the locking means. The brake pedal 16 is pivotably connected to a brake bracket 22 through a pivot. The interlocking means is described in detail by first referring to the connecting means. A cable 18 extends through a flexible sheath 17. One end of the sheath 17 is attached to a predetermined fixed portion, for example, a base plate (not shown) and the other end is secured to a holder 21 which will be described later. One end of the cable 18 is connected to the slide plate 15 via a pin. Then withdrawal of the cable 18 moves the slide plate 15 to the left in FIG. 1, that is, in a direction to disengage the shoulder 15a from the pit 13b of the lock piece 13. Thus a great load is applicable to the cable 18 as compared with the other mode of operation wherein a load is applied so as to push the cable. Thus the cable 18 will last longer. A spring 19 is connected between the slide plate 15 and the ratchet plate 6 for biasing the slide plate 15 to the right, that is, in a direction opposite to the direction of withdrawal through the cable 18.

The other end of the cable 18 is connected to one end of a lever 20 which is rotatable about a horizontal pivot by toeing down the brake pedal 16. The lever 20 at an intermediate thereof is mounted for pivotal motion on a holder 21 through a pivot. The holder is in turn attached to a predetermined location, for example, a location near a dash panel (not shown), of the brake bracket 22. The lever 20 has one end extending toward the brake pedal 16 and another end remote from the brake pedal 16. The cable 18 is connected to the other end of the lever 20. The one end of the lever 20 is provided with a cam follower in the form of a roller 23, which is in contact with a cam plate 24 secured to the brake pedal 16. When the brake pedal 16 is stepped down, the cam plate 24 moves down the one end of the lever 20 having the roller 23 pivoted. The lower surface of the cam plate 24 forms a cam surface with which the roller 23 is in rolling contact. The cam surface includes a ramp cam segment which serves to move down the roller 23 at the initial stepping down of the brake pedal 16 and an arcuate cam segment which is circular about the pivot of the brake pedal 16. In other words, the distance of ramp segment from the pivot of the brake pedal varies while the distance of the arcuate segment from the pivot of the brake pedal is fixed. After the brake pedal 16 is stepped down beyond a predetermined stroke, the roller 23 comes in contact with the arcuate segment past the ramp segment so that the roller 23 is no longer moved down and the cable 18 is pulled no further. Thus the force of stepping down the brake pedal 16 is not transmitted beyond a predetermined level. In this way, the cam plate 24 and the lever 20 constitute the conversion mechanism which cooperates with the connecting means such that locking can be cancelled within the range of a stroke consisting of a clearance for and a moderate toeing on the brake pedal 16.

The operation of the apparatus of the above-mentioned construction is described below, FIG. 1 shows the shift lever 1 which is locked in the parking range. In this state, the detent pin 5 is engaged with the first engagement portion 8 of the ratchet plate 6 while the lock piece 13 is brought to the raised position and prevented by the slide plate 15 from moving down. It is thus impossible to disengage the detent pin 5 from the first engagement portion 8 by pushing in the knob 4 of the shift lever 1 for the purpose of moving down the detent pin 5. It is thus prohibited to manipulate the shift lever 1 from the parking range to another range.

When the brake pedal 16 is stepped down, the one end of the lever 20 is moved down by the cam plate 24 so that the lever 20 acts to draw in the cable 18, as shown in broken lines in FIG. 1. The slide plate 15 is moved to the left in FIG. 1 to disengage its shoulder 15a from the pit 13b of the lock piece 13. Then the lock piece 13 is released from the prohibited downward movement. With the lock piece 13 kept unlocked, the knob 4 can be pushed in to move down the detent pin 5 to disengage the pin from the first engagement portion 8 so that the shift lever 1 may be turned or shifted to another range. Once the shift lever 1 is changed from the parking range to the other range, the detent pin 5 is disengaged from the recess 13a of the lock piece 13 so that the lock piece 13 is maintained at the lowered position. Then the shoulder 15a of the slide plate 15 abuts the other side edge of the lock piece 13 to prevent the slide plate 15 from moving back to the locking position shown in FIG. 1. At this point, the lever 20 is kept in the clockwise rotated position shown by broken lines in FIG. 1, the lever 20 does not interfere with the movement of the cam plate 24 and hence, the brake pedal 16 because the roller 23 contacts the lower surface of the cam plate 24. Also when the brake pedal 16 is stepped in so that the lever 20 is rotated clockwise by the cam plate 24 beyond a predetermined extent, the roller 23 comes in contact with the arcuate cam segment of the cam plate 24 which is circular about the pivot of the brake pedal 16. Then it is prohibited that the lever 20 is further rotated to additionally draw the cable 18 in. It is unnecessary to apply an increased toeing force to the brake pedal 16 which adversely affects a braking feel. In addition, no extra load is applied to the components including the lever 20, which is advantageous for the strength and durability of the mechanism.

When it is desired to shift the shift lever 1 to the parking range again, the detent pin 5 first enters the recess 13a of the lock piece 13 and then engages the first engagement portion 8. The lock piece 13 is drawn upward in association with this movement of the detent pin 5 while the resilient force of the spring 19 moves the slide plate 15 back to locking position shown in FIG. 1.

Since the locking apparatus of the present invention carries out locking and unlocking of the shift lever to and from the parking range through mechanical means and not through electrical means, it is advantageously applicable to an automatic transmission of the hydraulic control type. The locking apparatus operates without a trouble associated with an electrical system and is thus highly reliable. Since the apparatus locks the shift lever only at the parking range, the mechanism associated with the shift lever 1 is simple, which also contributes to improved reliability.

Since the lever 20 is received in the holder 21 and connected to the cable 18 with the sheath 17 secured to the holder 21, the mechanism associated with the brake pedal 16 is simple. It is easy to assemble these components. The use of the cam plate 24 maintains a braking feel unchanged and contributes to the improved durability of the associated components.

Although the locking means is composed of two members, the lock piece 13 and the slide plate 15 in the illustrated embodiment, the present invention is not limited thereto. For example, another design may be contemplated wherein only a slide plate is used to prevent the detent pin from disengaging from the first engagement portion of the ratchet plate. Although the cam plate and the lever consititute a conversion mechanism for converting a pivotal movement of the brake pedal into a linear movement in the illustrated embodiment, the present invention is not limited thereto. For example, a gear or a link mechanism may be used to form a conversion mechanism for converting a pivotal movement of the brake pedal into a rotational or liner movement. The connecting members used herein are not limited to the cable and the sheath shown in the embodiment, and any desired connecting members may be used.

What I claim is:

1. In combination with an automobile having a pivotally movable brake pedal and a shift lever adapted to be pivotally rotated and set at any desired one of positions corresponding to a plurality of driving states including a parking state,
   an apparatus for locking the shift lever, comprising
   a detent pin associated with the shift lever so as to by moved up and down by push-button manipulation,
   a ratchet plate including at least an engagement portion for engaging the detent pin to prevent pivotal rotation of the shift lever when the shift lever is set at the parking state,
   means for locking the detent pin, said locking means preventing the detent pin from disengaging from the engagement portion in a locking state, but allowing the detent pin to disengage from the engagement portion in an unlocking state,
   a cam attached to the brake pedal and
   a lever having opposite ends and being pivoted at an intermediate portion thereof, said lever being pivotally moved when one end of the lever is urged in one direction by the cam in response to the stepping down of the brake pedal,
   a cable connecting the other end of said lever to said lock means and
   an elongated sheath having opposite ends secured to fixed portions for enclosing the cable.

2. The apparatus of claim 1 wherein said locking means includes
   a lock piece disposed adjacent said ratchet plate and having a recess for engaging said detent pin, the lock piece being movable up and down, and
   a slide plate disposed below said lock piece and movable between a first position at which the slide plate engages said lock piece and a second position at which the slide plate is out of engagement with said lock piece, the slide plate being connected to said cable.

3. The apparatus of claim 2, wherein said lock piece has a pit formed at a lower end thereof and said slide plate has a shoulder adapted to engage the pit to prevent the lock piece from moving down.

4. The apparatus of claim 3 wherein said locking means further includes a resilient member connected to said slide plate for biasing said slide plate in a direction to engage the slide plate shoulder with the lock piece pit,
   said slide plate being connected to the cable and the resilient member such that the cable draws the slide plate against the biasing force of the resilient member in response to a pivotal movement of the lever.

5. The apparatus of claim 1 which further comprises
   a brake bracket to which the brake pedal is pivotally mounted and
   a holder fixedly secured to the brake bracket, said lever being pivotally mounted to the holder.

6. The apparatus of claim 5 wherein one end of said sheath is fixedly secured to the holder.

7. The apparatus of claim 1 wherein said cam includes a cam surface for engaging the one end of said lever, said cam surface including a first segment whose distance from the pivotal axis of the brake pedal varies and a second segment whose distance from the pivotal axis of the brake pedal is fixed.

8. The apparatus of claim 7 wherein said lever has a roller rotatably mounted on the one end thereof, and the roller is in rolling contact with the cam surface of said cam as a cam follower.

9. The apparatus of claim 2, wherein said locking means further includes a guide member disposed to fit over the lock piece for linearly guiding the lock piece and another guide member disposed to fit over the slide plate for linearly guiding the slide plate.

* * * * *